United States Patent [19]

Lecuit et al.

[11] 3,723,596

[45] Mar. 27, 1973

[54] HYDROMAGNESITE HAVING A MODIFIED MORPHOLOGY AND METHOD FOR THE PREPARATION THEREOF

[75] Inventors: Paul Lecuit, Strombeek-Bever; Paul Demilie, Brussels, both of Belgium

[73] Assignee: Solvay & Cie, Brussels, Belgium

[22] Filed: Aug. 27, 1970

[21] Appl. No.: 67,518

[30] Foreign Application Priority Data

Aug. 28, 1969 France..............................6929553

[52] U.S. Cl....................................423/430, 23/304
[51] Int. Cl.................................................C01f 5/24
[58] Field of Search..........23/315, 67, 304; 252/443; 423/161, 430

[56] References Cited

UNITED STATES PATENTS

| 2,027,714 | 1/1936 | Abrahams | 23/67 |
| 2,550,708 | 5/1951 | Meyer | 23/67 |
| 3,169,826 | 2/1965 | Pond et al. | 23/67 |
| R22,952 | 12/1947 | Miller | 23/67 |

OTHER PUBLICATIONS

Chemical Abstracts, Vol. 64, 1966, p. 15090b.
Chemical Abstracts, Vol. 63, 1965, p. 2448a.

*Primary Examiner*—Oscar R. Vertiz
*Assistant Examiner*—Charles B. Rodman
*Attorney*—Robert E. Burns and Emmanuel J. Lobato

[57] ABSTRACT

Light hydromagnesite in spherical aggregates of small crystals having a pore volume superior to 4,000 mm.$^3$/g. is provided by precipitating hydromagnesite from an aqueous solution containing a soluble salt of magnesium and an alkali metal carbonate by a double decomposition reaction in the presence of a crystallization-habit modifying agent selected from the alkali metal polyphosphates. The new form of hydromagnesite is useful for the manufacture of thermal insulation products, absorbent and adsorbent agents and especially catalyst supports.

8 Claims, 1 Drawing Figure

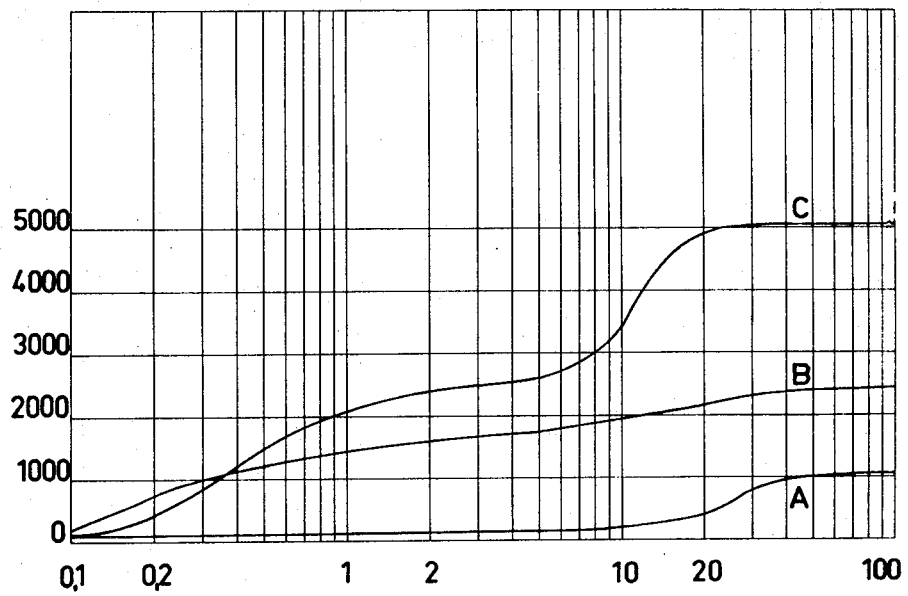

HYDROMAGNESITE HAVING A MODIFIED MORPHOLOGY AND METHOD FOR THE PREPARATION THEREOF

BACKGROUND OF THE INVENTION

This invention relates to a modified-morphology hydromagnesite comprising spheroidal crystal aggregates, and to a process for manufacturing the same.

Hydromagnesite of the composition $5MgO \cdot 4CO_2 \cdot 5H_2O$ or $4MgCO_3 \cdot Mg(OH)_2 \cdot 4H_2O$ may be obtained by a double-decomposition reaction from magnesium sulfate and sodium carbonate according to the following equation:

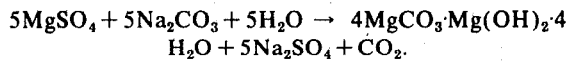

$$5MgSO_4 + 5Na_2CO_3 + 5H_2O \rightarrow 4MgCO_3 \cdot Mg(OH)_2 \cdot 4H_2O + 5Na_2SO_4 + CO_2.$$

The hydromagnesite prepared by this reaction comprises variously shaped aggregates of microcrystals with numerous jagged edges. Its properties may vary within wide limits according to the conditions of reaction, more particularly the temperature, the speed and order of introduction of the reagents, the pH of the medium, and the degree, if any, to which the sodium carbonate is replaced by caustic soda or sodium bicarbonate. However, the general characteristics of these known products include a fine particle size and an irregular particle shape, in particular the particles are non-spherical with a small pore volume.

Such hydromagnesite is not very suitable for certain applications, especially those in which a regular particle shape and free-flowing properties are desirable.

The known products can be classified into two clearly differentiated categories:

1. The heavy hydromagnesites, characterized by an apparent (free flow) density of between 0.45 and 0.70 kg./dm.$^3$, a mean particle diameter of between 30 and 80 microns, a particularly low pore volume of the order of 1,000 mm.$^3$/gm., and good flow properties;

2. The light hydromagnesites, which have an apparent (free flow) density of between 0.10 and 0.20 kg./dm.$^3$, a mean particle diameter of 1 to 200 microns, a larger pore volume than the heavy hydromagnesites, of the order of 2,000 mm.$^3$/gm. and poor flow properties.

SUMMARY OF THE INVENTION

A method has been discovered for producing hydromagnesites which exhibit at one and the same time the advantages of both of the types of commercial products described above, but which do not suffer from their disadvantages, and which furthermore have a particularly high pore volume. The hydromagnesites of the present invention have a new combination of properties and are particularly characterized by their form, namely, as spheroid crystal aggregates and by their high pore volume which is superior to 4,000 mm.$^2$/gm.

These properties make this new form of hydromagnesite particularly valuable for most applications and especially for the manufacture of catalyst supports, thermal insulation products and absorbent and adsorbent materials.

Also, according to the invention, hydromagnesites having new characteristics is obtained by a process comprising precipitating hydromagnesite by a double-decomposition reaction from aqueous solutions containing a soluble salt of magnesium and an alkali-metal carbonate in approximately stoichiometric proportions, in the presence of a crystallization-habit modifying agent constituted by an alkali-metal polyphosphate which is present in an amount of about 0.1 to 10 grams per kilogram of suspension.

BRIEF DESCRIPTION OF THE DRAWING

The FIGURE is a graph illustrating the variation of the cumulative volume of the pores in mm.$^3$/g. with the pore radius in microns for heavy commercial hydromagnesite (curve A), light hydromagnesite (curve B) and hydromagnesite of the present invention (curve C).

DESCRIPTION OF THE PREFERRED EMBODIMENTS

According to the present invention, modified hydromagnesites are provided in the form of spheroidal crystal-aggregates having

- an apparent (free flow) density of between 0.20 and 0.40 kg./dm.$^3$,
- a mean particle diameter of between 80 and 170 microns,
- a pore volume of more than 4,000 mm.$^3$/gm. and
- a flow property as herein defined of less than or equal to 5 mm.

To obtain hydromagnesite having the properties described above, hydromagnesite is precipitated by reaction of an aqueous solution of a magnesium salt and an alkali-metal carbonate in the presence of a crystallization-habit modifying agent which is an alkali metal polyphosphate. By polyphosphate is meant compounds referred to as hexametaphosphate, tetrametaphosphate, polyphosphate and the like, i.e., compounds of the formula $(MPO_3)_n$ or $M_{n+2}P_nO_{3n+1}$ wherein M is an alkali-metal and $n$ is an integer of 1 or more.

The alkali-metal carbonate may be replaced wholly or partly by the corresponding bicarbonate and it may also be replaced by a maximum of 20 percent molar of the corresponding hydroxide.

The reaction may be carried out between 50° and 200° C., under a pressure of 1 to 16 kg./cm.$^2$; however, it is preferred that it should be carried out at a temperature between 80° and 125° C. under atmospheric or autogenous pressure.

The following is a preferred mode of operation.

1. Three solutions are prepared:
    - solution A containing $Na_2CO_3$ and an alkali-metal polyphosphate;
    - solution B containing $MgSO_4$; and
    - solution C containing an alkali-metal polyphosphate only.
2. The solution C and a fraction of the solution A are introduced into a crystallizer and brought to the desired temperature.
3. Portions of the solutions A and B are then added continuously and in stoichiometric quantities.
4. Finally the balance of the solution B, corresponding to the initial quantity of the solution A, is added.

The reaction conditions, and particularly the temperature and the carbonate content of the carbonate solution, or the corresponding quantity of caustic soda or bicarbonate when used have an influence on certain characteristics of the product, particularly on the apparent specific gravity and the particle diameter.

Preferably the composition of solution A is adjusted to achieve a concentration of carbon dioxide comprised between 20 g. per kg. and saturation at the working temperature. The most preferred range is comprised between 50 and 90 percent of the saturation concentration. The concentration of solution B which contains $MgSO_4$ is desirably between 10 g./kg. and the saturation concentration of magnesium salt, and most preferably between 50 and 90 percent of the saturation concentration.

The polyphosphate concentration of solution C is generally comprised between 0.1 and 10 g./kg. and preferably between 1 and 3 g./kg.

As described above, a satisfactory method of combining the reagents according to the present invention is to add a part of solution A to solution C and then add solution A and solution B in stoichiometric amounts to the mixture of solution A and C and a fraction of solution A. As to the rate of combination of the reagents, if W is the weight of the mixture of solutions A, B and C already combined, and w the weight of solutions A and B added every hour, w/W has to be inferior to 100 g./kg. h.; w/W is preferably comprised between 5 and 25 g./kg. h. Preferably, solution C is used in an amount of about 10 to 30 percent by weight of the total of solutions A, B and C at the end of the reaction. The most preferred value is about 20 percent. The part of solution A added to solution C in the first step is about 0 to 20 percent inclusive of the total amount of solution A which is used.

Solution A contains in addition to the carbonate and/or the bicarbonate and when used hydroxide, an amount of polyphosphate such as to maintain the concentration in the reaction medium between 0.1 and 10 g./kg. and preferably between 1 and 3 g./kg.

The pH is maintained below 10 during the reaction by the selective concentrations of the reactants.

The hydromagnesites according to the present invention, because of their particular morphology are useful for the manufacture of thermal insulation products and of absorbent and adsorbent agents and particularly catalyst supports.

For this latter application, their very great pore volume, their high specific surface area, their comparatively high apparent specific gravity and their good flow properties constitute advantageous characteristics.

A particular application of the hydromagnesites to which the invention relates is the preparation of catalyst supports for the polymerization of olefins. These catalyst supports are obtained by the calcination of the hydromagnesites, the calcination temperature depending upon the type of catalyst supports which it is desired to obtain.

During the preparation of reactive supports which can react with halogenated derivatives of transition metals as described in British Pat. No. 1,140,649 of Oct. 17, 1967, granted to Solvay & Cie., the calcination is carried out between 400° and 600° C. This calcination does not change most of the properties of the initial hydromagnesite and in particular does not affect its morphology and its great pore volume. The latter plays an important part in the operation of impregnating the material with a liquid halogenated derivative of a transition metal to produce a polymerization catalyst.

The catalysts thus obtained possess a specific surface area equivalent to that of the catalysts produced from commercial light hydromagnesite, and this gives them a catalytic activity which is practically the same as that of these latter catalysts. Furthermore, their particular morphology, which is reproduced in the polymer formed, makes it possible to obtain polymer particles of a spherical shape which possess the advantage of great mobility and facilitate the separation of the polymer and the solvent.

The high porosity of hydromagnesite according to the invention increases its absorption capacity in its uses as an absorption or purifying agent.

The following example which further illustrates the best mode currently contemplated for carrying out the invention must not be construed as limiting the invention in any manner.

EXAMPLE

The following solutions are prepared:
a solution A containing 196 grams of $Na_2CO_3$ per kilogram and 4 grams of sodium hexametaphosphate per kilogram;
a solution B containing 78 grams of $MgSO_4$ per kilogram; and
a solution C containing 0.6 grams of sodium hexametaphosphate per kilogram.

Three kilograms of solution C and 500 grams of solution A are introduced into a 16-liter crystallizer. It is brought to 100° C. The following are then added, starting simultaneously:
the solution A at the rate of 1,500 grams per hour for 100 minutes;
the solution B at the rate of 4.5 kilograms per hour for 2 hours.

After 2 hours, the precipitate of hydromagnesite is decanted and washed several times in the crystallizer so as to eliminate the sodium sulfate. It is then separated on a filter and dried at 100° C. for 8 hours.

In this way, 530 grams of hydromagnesite are obtained, possessing the properties shown in Table 1, wherein the properties of a commercial heavy magnesite, a light magnesite prepared in the absence of a polyphosphate and hydromagnesite prepared according to the invention have been compared. The properties were determined by the following tests.

Specific Surface Area

The specific surface area (B.E.T.) is calculated by the equation of Brunauer, Emmett and Teller applied to the values of the adsorption/desorption isotherm of nitrogen at its boiling point. Cf. Brunauer and co-workers JACS 60, p. 309 (1938), and British Standard BS 4359 part 1 1969.

Pore Volume

The determination of the porosity is carried out in the MAREP (S.N. MAREP, Paris 7th) portable porometer unit (Bulletins No. 660 and 925). The method is based on the phenomenon of capillary depression. After the evacuation of a cell containing the sample, mercury is injected at a pressure increasing to a final pressure of 1,000 bars and at the same time the variation in volume is measured by an electric gage. The radius of the pores is calculated by Jurin's law $r = (-2\sigma \cos \Theta)/P$ where $\sigma$ = surface tension of mercury, $\Theta$ = angle of contact between solid and mercury, and $P$ = the absolute pressure necessary to force the mercury into a pore. The results of the determination are shown in the form of a graph, the abscissa of which represents the radius of the pores expressed in microns and the ordinate of which represents the cumulative volume expressed in mm.$^3$ per gm. Here the cumulative volume is given for pores of a diameter less than or equal to 100 microns.

Flow Property

The estimation of the flow properties used is based on the measurement of the material's ability to flow through truncated conical funnels of increasing diameters and will be referred to as the truncated conical funnel flow test.

The apparatus comprises seven hoppers in the form of truncated cones with their internal walls polished and chromium-plated, the angle of the apex being 45° and the diameter of the lower aperture being respectively 3, 5, 10, 15, 20, 25 and 30 mm. The apertures of the seven hoppers can be closed simultaneously by a single shutter. The truncated cones are mounted on a support which holds them by their upper part. This support can fall through a height of 1 cm., delivering an impact to all the truncated cones as a result of its fall. The funnels are filled with the material under test, which is made level with the upper rim of the cones.

If 2 minutes after the opening of the shutter no flow has occurred, the support is allowed to fall. The impact which follows brings about the flow of the material, and the diameter of the smallest aperture through which flow takes place is recorded as the result of the test.

The graph forming the single FIGURE of the accompanying drawing illustrates clearly the differences in porosity between the heavy commercial product (curve A), the light product (curve B) and the product of the example (curve C).

In this graph, the cumulative volume of the pores expressed in mm.$^3$/g. has been plotted as the ordinate and the radius of the pores expressed in microns has been plotted as the abscissa. The cumulative volume of the pores corresponding to a pore radius of 100 microns for the hydromagnesite of the example (C) is five times that of the commercial product (A) and more than twice that of the light product (B).

Furthermore the mobility or flow property of the product of the example (C) is comparable with that of the heavy commercial product (A) and is distinctly superior to that of the light product (B).

The difference between the product of the example (C) and a product such as the light hydromagnesite (B) can be seen more clearly still from microphotographs of typical samples of the two products.

To demonstrate the advantage of using hydromagnesite according to the present invention for the preparation of catalysts for the polymerization of olefins, three olefin polymerization catalysts have been prepared, as described in Examples 1 and 6 of British Pat. No. 1,140,649 of Oct. 17, 1967, in the name of Solvay et Cie., one starting from heavy hydromagnesite (product A), the second starting from light hydromagnesite (product B), the last starting from the product of the example (product C). The characteristics of the catalysts and the polyethylenes prepared from these products are shown in Table 2.

The results of Table 2 show an improvement in the morphology of the polyethylene obtained with a catalyst produced from the hydromagnesite of the present invention. The polyethylene with a spherical morphology separates easily from the solvent and has a greater ability to flow out of hoppers.

There is also an increase in the quantity of titanium fixed on the catalyst support derived from the hydromagnesite of the present invention.

The advantage of using the hydromagnesite of the present invention for the preparation of catalysts for the polymerization of olefins is also demonstrated by the following preparation of two catalysts for the polymerization of olefins.

Hydromagnesite of the formula 3 $MgCO_3 \cdot Mg(OH)_2 \cdot 3H_2O$ is heated to a temperature of 500° C. for 16 hours under a moist flow of nitrogen. Twenty grams of the magnesium oxide formed are withdrawn and suspended in 100 cm.$^3$ of hexane under nitrogen. The suspension is heated to 25° C. and there are added dropwise, 4.2 g. of triethylaluminum in a solution in hexane having a concentration of 500 g. per liter. The mixture is stirred and the temperature is kept constant during a period of 30 minutes.

After drying and washing with hexane, the solid impregnated product is submitted to a treatment with $TiCl_4$ which has been heated under reflux at 130° C. for 1 hour. The solid product resulting from this treatment is then washed with hexane and dried under a dry flow of nitrogen. It contains 37 mg. of Ti and 14 mg. of Al per g. of support.

Sixty-five milligrams of the solid compound formed are introduced along with 100 mg. of triisobutylaluminum in a 1.5 liter autoclave which contains 0.5 liter of hexane. The autoclave is made with stainless steel and is provided with a blade stirrer. The temperature of the apparatus is raised to 85° C. and ethylene and hydrogen are introduced under respective partial pressures of 10 and 4 kg./cm.$^2$.

The temperature is kept constant for 1 hour and the pressure is also kept constant by adding ethylene. After removing the gases from the autoclave, the amount of polyethylene and the melt index were determined.

TABLE 1

| Characteristic properties | Units | Heavy hydromagnesite | | Light hydromagnesite | | Product of the example |
|---|---|---|---|---|---|---|
| | | Commercial product * | Extreme limits | Known product ** | Extreme limits | |
| Apparent (free flow) density | Kg./dm.$^3$ | 0.65 | 0.45–0.70 | 0.17 | 0.10–0.20 | 0.23 |
| Mean particle diameter | Microns | 72 | 30–80 | 150 | 120–200 | 140 |
| Specific surface area (B.E.T.) | M.$^2$/g | 5 | 3–7 | 15 | 10–20 | 14 |
| Pore volume | Mm.$^3$/g | 1,080 | 500–1,500 | 2,420 | 2,000–3,000 | 5,050 |
| Flow property | Mm. | 3 | 3–5 | 10 | 10–15 | 5 |

*Hydromagnesite of the grade "PDS" sold by the Societa Generale per l'Industria della Magnesia.
**Product produced as in example, but in the absence of sodium hexametaphosphate.

Catalyst D referred to in Table 3 is prepared from heavy hydromagnesite and catalyst E is obtained from the hydromagnesite of the present invention.

The characteristics of the catalysts, and of polyethylenes obtained by means of these catalysts, are shown in Table 3.

The use of the hydromagnesite according to the present invention makes it possible to obtain catalysts with a higher content of organometallic derivative (e.g. of an organo-aluminum compound) and which have an improved effective activity during polymerization.

TABLE 2

| Characteristic Properties | Units | Product A | B | C |
|---|---|---|---|---|
| Chemical composition of the impregnated support | | | | |
| Mg | g./kg. | 492 | 477 | 452 |
| Cl | g./kg. | 153 | 187 | 182 |
| Ti | g./kg. | 18 | 13 | 23 |
| Effective activity | (1) | 320 | 690 | 650 |
| Polyethylene Apparent (free flow) density | kg./dm$^3$ | 0.20 | 0.155 | 0.21 |
| Appearance of granules | - | irregular | fluffy | Spherical |

(1) The effective activity is expressed in grams of polyethylene per hour per gram of impregnated support per kg./cm.$^2$ of ethylene.

TABLE 3

| Characteristic Properties | Units | Catalyst D | E |
|---|---|---|---|
| Chemical composition of the impregnated support | | | |
| Ti | g./kg. | 37 | 35 |
| Al | g./kg. | 14 | 22 |
| Effective activity | (2) | 100 | 250 |
| Polyethylene Melt Index | (3) | 0.25 | 0.25 |

(2) The effective activity is expressed in grams of polyethylene per hour per gram of impregnated support per kg./cm.$^2$ of ethylene.
(3) Determined according to the ASTM standards D 1505-57 T and ISO/R 292-1963.

What we claim as new and desire to secure by Letters Patent is:

1. In a process for the preparation of a hydromagnesite wherein the hydromagnesite is precipitated from an aqueous solution containing a soluble salt of magnesium and an alkali metal carbonate by a double-decomposition reaction the improvement which comprises carrying out said precipitation in the presence of 0.1 g. to 10 g. per kg. of reaction medium of a crystallization-habit modifying agent selected from the polyphosphates having the formula $M_{n+2}P_nO_{3n+1}$, wherein M is an alkali metal and $n$ is an integer of 1 or more.

2. A process according to claim 1 in which the soluble salt of magnesium and the alkali metal carbonate are in substantially stoichiometric proportions.

3. A process according to claim 1 in which the alkali metal carbonate is replaced at least in part by the corresponding bicarbonate.

4. A process according to claim 1 in which the alkali metal carbonate is replaced by a maximum of 20 mole percent of the corresponding hydroxide.

5. A process according to claim 1 in which the crystallization-habit modifying agent is sodium hexametaphosphate.

6. A process for the preparation of a hydromagnesite which comprises carrying out a double decomposition reaction in an aqueous reaction medium at about 50° to 200° C. between substantially stoichiometric quantities of magnesium sulfate and a carbonate compound selected from the group consisting of alkali metal carbonate, alkali metal bicarbonate mixtures thereof and a combination of any of the foregoing with up to 20 mole percent of an alkali metal hydroxide in the presence of 0.1 g. to 10 g. per kg. of said reaction medium of a crystallization-habit modifying agent which is polyphosphate having the formula $M_{n+2}P_nO_{3n+1}$, wherein M is an alkali metal and $n$ is an integer of 1 or more and then precipitating the thus formed hydromagnesite.

7. A process according to claim 6 in which said double decomposition reaction is carried out by combining an aqueous solution containing about 0.1 to 10 g./kg. of said polyphosphate with a portion of an aqueous solution containing said carbonate compound in a concentration of about 20 g./kg. based on the weight of $CO_2$ to the saturation concentration and said polyphosphate in an amount such that the concentration of said polyphosphate in said reaction medium is maintained at about 0.1 to 10 g./kg., adding to the thus formed mixture in stoichiometric portions said solution of carbonate compound and an aqueous solution of magnesium sulfate in a concentration of about 10 g./kg. to the saturation concentration and then adding the remaining portion of the solution of magnesium sulfate corresponding to the portion of the solution of carbonate compound combined initially with said polyphosphate solution.

8. A process for the preparation of light hydromagnesite consisting essentially of spherical aggregates of small crystals having a pore volume superior to 4,000 mm.$^3$/g., wherein the hydromagnesite is precipitated from an aqueous solution containing a soluble salt of magnesium and an alkali metal carbonate by a double-decomposition reaction the improvement which comprises carrying out said precipitation in the presence of sodium hexametaphosphate in an amount of 0.1 g. to 10 g. per kg. of the reaction medium.

* * * * *